United States Patent [19]

Takikawa et al.

[11] Patent Number: 5,050,790
[45] Date of Patent: Sep. 24, 1991

[54] PROCESS FOR THE FABRICATION OF METAL-MADE CARRIER BODY FOR EXHAUST GAS CLEANING CATALYST

[75] Inventors: Kazunori Takikawa, Numazu; Yuzo Hitachi, Shizuoka, both of Japan

[73] Assignee: Usui Kokusai Sangyo Kabushiki Kaisha, Japan

[21] Appl. No.: 495,883

[22] Filed: Mar. 19, 1990

Related U.S. Application Data

[63] Continuation of Ser. No. 288,082, Dec. 22, 1988, abandoned.

[30] Foreign Application Priority Data

Dec. 28, 1987 [JP] Japan .................. 62-329463

[51] Int. Cl.$^5$ .............. C23C 9/00; B23K 1/008; B23K 101/02
[52] U.S. Cl. .................. 228/181; 228/190; 228/254; 228/258; 228/173.6
[58] Field of Search ........... 228/254, 258, 132, 173.4, 228/173.6, 181, 182, 183, 190

[56] References Cited

U.S. PATENT DOCUMENTS

| | | | |
|---|---|---|---|
| 3,129,502 | 4/1964 | Olson | 228/254 |
| 3,208,131 | 9/1965 | Ruff et al. | 228/254 |
| 3,844,027 | 10/1974 | Hagen et al. | 228/254 |
| 3,891,784 | 6/1975 | Allardyce et al. | 228/181 |
| 3,948,431 | 4/1976 | Niimi et al. | 228/181 |
| 4,053,969 | 10/1977 | Bayard | 228/181 |
| 4,059,217 | 11/1977 | Woodward | 228/181 |
| 4,477,012 | 10/1984 | Holland et al. | 228/181 |

FOREIGN PATENT DOCUMENTS

| | | | |
|---|---|---|---|
| 13462 | 1/1979 | Japan | 228/181 |
| 4373 | 1/1981 | Japan | 228/181 |
| 1585 | 1/1982 | Japan | 228/181 |
| 42173 | 3/1984 | Japan | 228/181 |
| 101243 | 6/1984 | Japan | 228/258 |
| 101244 | 6/1984 | Japan | 228/181 |

Primary Examiner—Sam Heinrich
Attorney, Agent, or Firm—Lowe, Price, LeBlanc, Becker & Shur

[57] ABSTRACT

A metal-made carrier body is fabricated for an exhaust gas cleaning catalyst. At least one sheet-like metal band and at least one corrugated metal band, each of said bands being made of a thin metal sheet, are superposed one over the other so as to establish contacts therebetween, thereby forming a multi-layered composite body defining a number of network-patterned gas flow passages along the central axis thereof. The composite body is dipped in an electroless plating bath capable of forming a brazing coating layer on the composite body so as to form a brazing coating layer at least in the vicinity of each contact except for the contact itself. The composite body is then subjected to a heat treatment so as to braze the contacts between the sheet-like metal band and corrugated metal band. Before dipping the composite body in the plating bath, it may optionally be enclosed in a cylindrical metal casing. The composite body and cylindrical metal casing are also brazed together at their mutual contacts.

12 Claims, 2 Drawing Sheets

PROCESS FOR THE FABRICATION OF METAL-MADE CARRIER BODY FOR EXHAUST GAS CLEANING CATALYST

This application is a continuation of application Ser. No. 07/288,082, filed Dec. 22, 1988, now abandoned.

BACKGROUND OF THE INVENTION

1. Field of the Invention

This invention relates to a process for the fabrication of a metal-made carrier body for an exhaust gas cleaning catalyst which is generally interposed as an exhaust gas cleaning means at an intermediary point of an exhaust system of an automotive vehicle. More specifically, this invention is concerned with a process for the fabrication of a metal-made carrier body whose principal components—such as one or more sheet-like metal bands made of thin metal sheets and one or more corrugated metal bands and optionally, a metal-made casing—are firmly brazed together, so that the metal-made carrier body remains intact over a long period of time and exhibits excellent properties in vibration proofness and the like.

2. Description of the Related Art

As carrier bodies for an exhaust gas cleaning catalyst of the above sort, there have conventionally been known metal-made carrier bodies which can withstand heat (high temperatures), impacts and vibrations in use and can also carry a catalyst in a large amount per unit volume. In order to fabricate such metal-made carrier bodies, at least one sheet-like metal band and at least one corrugated metal band, each of said bands being made of a thin metal sheet, are superposed one over the other so as to establish contacts therebetween. Thereafter, they are rolled together into a spiral form or are laminated in layers, thereby forming a multi-layered composite body defining a number of network-patterned gas flow passages along the central axis thereof. If necessary, the multilayered composite body is enclosed in a cylindrical metal-made casing which are open at both ends thereof. The contacts between the sheet-like metal band and corrugated metal band and between the composite body and the cylindrical metal casing are then bonded.

The above bonding may be conducted, for example, by electron beam welding, laser welding or arc welding as disclosed in Japanese Patent Application Laid-Open Nos. 13462/1979, 1585/1982 and 4373/1981 by way of example, by applying a paste of a binder and a brazing filler metal to the surface of at least one of the sheet-like metal band and corrugated metal band, by applying a binder to the surface of at least one of the sheet-like metal band and corrugated metal band and then applying powder of a brazing filler metal further, or by applying a sheet-like solder (brazing material).

The above-described bonding methods, which have conventionally been employed upon fabrication of metal-made carrier bodies, are however accompanied by the following problems.

The former methods such as electron beam welding and laser welding require a special and expensive apparatus, and the productivity is unavoidably reduced due to the need for cumbersome and complicated work involving spot welding at narrow superposed contact portions or inner contact portions.

Brazing requires the use of a costly brazing material. In addition, complex and time-consuming work is indispensable upon coating and drying the brazing material. If planar band and corrugated band, at least one of said bands being coated with a brazing material, are superposed one over the other and are then rolled together into spiral form to form a multi-layered composite body, the composite body is then enclosed in a cylindrical metal casing, and contacts between the planar band and corrugated band are then brazed, the dimensions of the components vary compared to their dimensions before the brazing so that the rolling may become looser or a gap may be formed at the contacts. This can be attributed to the fact that the coating layer of the brazing material present at the contacts between the planar band and corrugated band is fused away. Since the composite body is rolled in many layers, the loose and extra length becomes substantial so that problems would arise in vibration proofness. A metal-made carrier body of the above sort has an extremely large potential problem that when actually incorporated in the exhaust system of an automotive vehicle, gaps would be formed due to the high-temperature environment of the exhaust gas as the time goes on, to say nothing of the above heat treatment. This problem also arises even when either one or both of the planar and corrugated bands is plated with the brazing metal instead of coating it with the brazing material. Even when constituent materials with a coating layer of a brazing material formed in advance on a surface thereof are used and are thereafter brazed subsequent to their assembly into a metal-made carrier body, the bonding of the constituent materials is insufficient and the thus-fabricated metal-made carrier body does not have excellent vibration proofness.

SUMMARY OF THE INVENTION

In one aspect of this invention, there is thus provided a process for the fabrication of a metal-made carrier body for an exhaust gas cleaning catalyst. At least one sheet-like metal band and at least one corrugated metal band, each of said bands being made of a thin metal sheet, are superposed one over the other so as to establish contacts therebetween, thereby forming a multi-layered composite body defining a number of network-patterned gas flow passages along the central axis thereof. The composite body is dipped in an electroless plating bath capable of forming a brazing coating layer on the composite body so as to form a brazing coating layer at least in the vicinity of each contact except for the contact itself. The composite body is then subjected to a heat treatment so as to braze the contacts between the sheet-like metal band and corrugated metal band.

In another aspect of this invention, there is also provided a process for the fabrication of a metal-made carrier body for an exhaust gas cleaning catalyst. The carrier body is enclosed in a cylindrical metal casing. Before dipping the composite body in the plating bath, it is enclosed in the cylindrical metal casing. The composite body and cylindrical metal casing are also brazed together at their mutual contacts in a similar manner as in the first aspect of this invention.

The principal characteristic feature of each fabrication process according to this invention resides in that no bonding material is interposed between the planar metal band and the corrugated metal band, each of which is made of a thin metal sheet, upon formation of the multi-layered composite body as a principal member of the carrier body.

In the present invention, the planar meal band an corrugated metal band, each of which is made of a heat-resistant thin metal sheet such as an ironchromium metal sheet, are formed into the multi-layered composite body by either one of the following methods.

(i) They are superposed one over the other so as to establish contacts therebetween. The thus-superposed bands are then rolled together into a spiral form, thereby forming a multi-layered composite body defining a number of network-patterned gas flow passages along the central axis thereof.

(ii) They are superposed one over the other in layers so as to establish contacts therebetween, thereby forming a multi-layered composite body defining a number of network-patterned gas flow passages along the central axis thereof.

Thereafter, the multi-layered composite body is enclosed in the cylindrical metal casing if desired, and is dipped in an electroless plating bath capable of forming a brazing coating layer on the composite body. From the viewpoint of heat resistance as well as from the consideration that the activity of an exhaust gas cleaning catalyst such as platinum, palladium or rhodium is not lowered, the brazing coating layer is formed by plating the multi-layered composite body in a plating bath which contains copper, nickel, a copper-base alloy or a nickel-base alloy as a plating component.

By the above plating, a brazing coating layer of the above component is formed in the vicinity of each contact except for the contacts themselves between the planar metal band and corrugated metal band, which constitute the multi-layered composite body, and between the multi-layered composite body and cylindrical metal casing.

Thereafter, the thus-plated multi-layered composite body and cylindrical metal casing if any are subjected to a heat treatment at a temperature at least equal to the melting point of the brazing material forming the brazing coating layer in a reducing atmosphere furnace or vacuum furnace. Owing to this heat treatment, the brazing material is fused so that a fused brazing material cumulation is formed at each of the contacts between the planar metal band and corrugated metal band and also at each of the contacts between the multi-layered composite body and cylindrical metal casing. Since no dimensional changes have taken place at the contacts after the brazing, the contacts are not loosened but are brazed firmly.

PREFERRED EMBODIMENTS OF THE INVENTION

Figure 4:
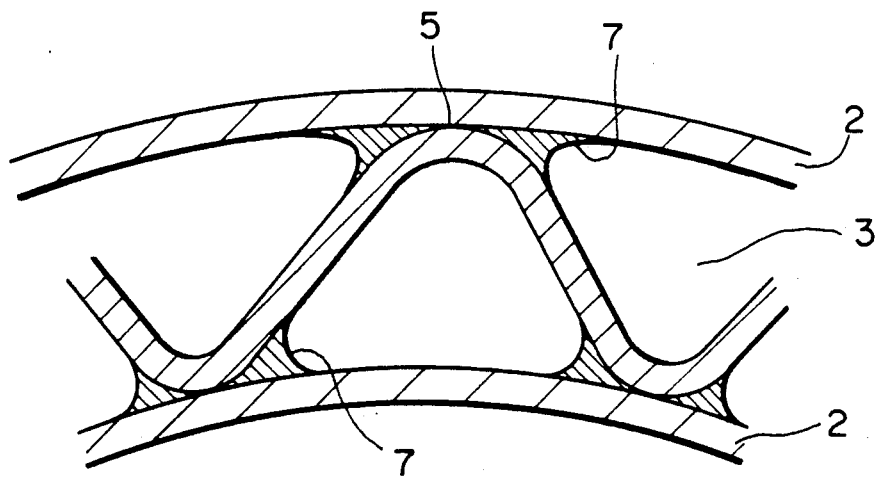
FIG. 4 is an enlarged fragmentary cross-section of the contacts between the planar metal band and the corrugated metal band after they have been subjected to a brazing heat treatment subsequent to their dipping treatment in the electroless plating bath capable of forming a brazing coating layer

Referring first to FIG. 4 which is the overall perspective view of the metal-made carrier body according to the first embodiment of this invention, a metal-made carrier body 1 has been constructed by enclosing a rolled, multi-layered composite body of a planar metal band 2 and a corrugated metal band 3, each of which is made of a thin metal sheet, in a cylindrical metal casing 4.

Figure 1:
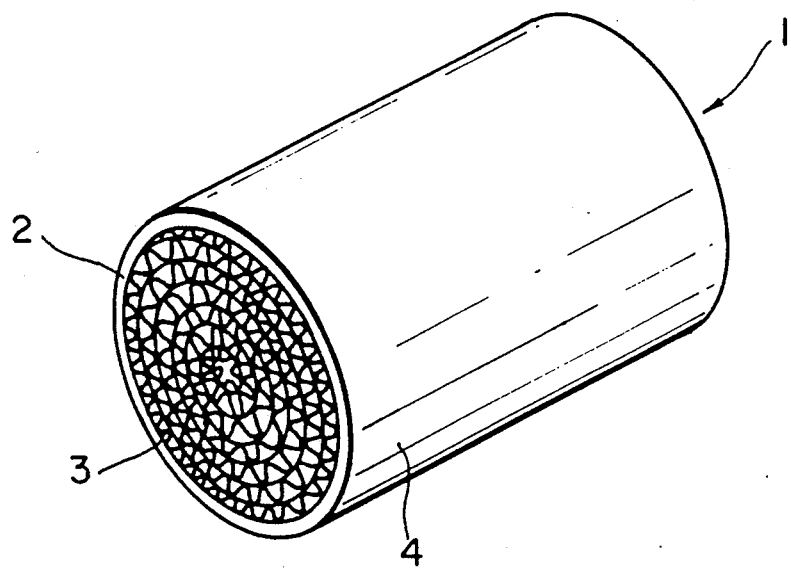
FIG. 1 is an overall perspective view of a metal-made carrier body according to a first embodiment of this invention.
Figure 2:
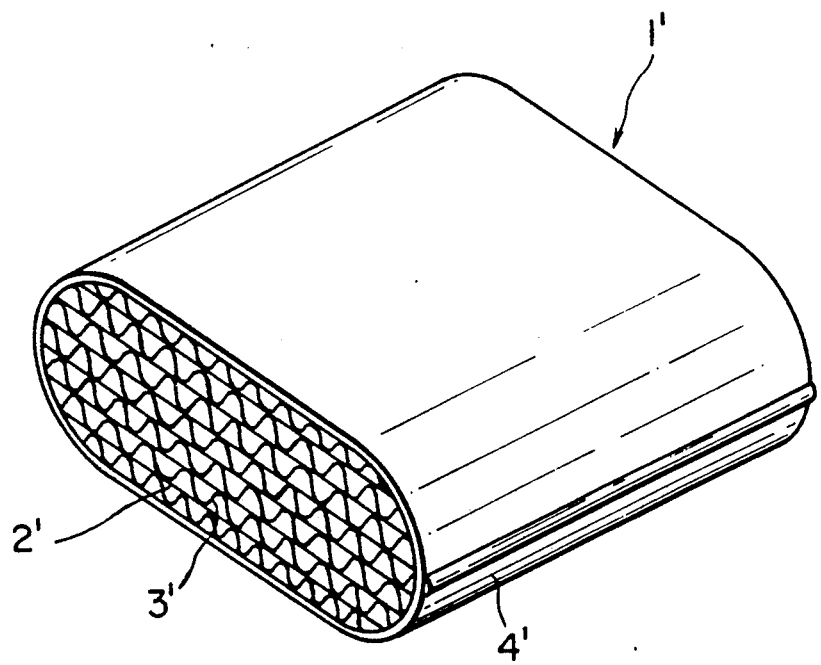
FIG. 2 is an overall perspective view of a metal-made carrier body according to a second embodiment of this invention.

Reference is next had to FIG. 2, which is the overall perspective view of the metal-made carrier body according to the second embodiment of this invention. A metal made carrier body, which is generally indicated at reference numeral 1', has been constructed by enclosing a laminated, multi-layered composite body of a planar metal band 2' and a corrugated metal band 3', each of which is made of a thin metal sheet, in a cylindrical metal casing 4' having an oval cross-section.

Figure 3:
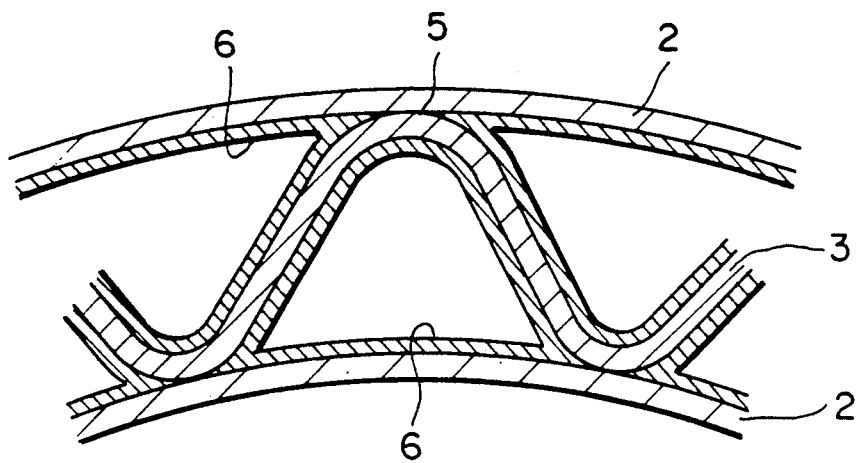
FIG. 3 is an enlarged fragmentary cross-section of contacts between a planar metal band and a corrugated metal band immediately after their dipping treatment in an electroless plating bath capable of forming a brazing coating layer.

Further reference is now made to FIG. 3, in which a brazing coating layer 6 such as nickel braze has been formed uniformly by electroless plating except for contacts 5.

Still further reference is made to FIG. 4, which illustrates the formation of a fused brazing material cumulation 7 at each contact 5 due to fusion of the brazing coating layer. According to the present invention, the contacts 5 are bonded firmly owing to their respective fused brazing material cumulations 7 of the brazing material formed there.

According to the processes of this invention, a brazing coating layer can be formed in the vicinity of contacts between principal components, which constitute a metal-made carrier body, except for the contacts themselves by economical electroless plating without using any expensive high-temperature brazing material. It is hence possible to avoid such complex and time-consuming work as seen in the conventional brazing material coating method, such as uniform coating or drying of the brazing material, or difficult work such as welding work by electron beam welding or laser or arc welding or lamination of members with a brazing material interposed therebetween.

In addition, the dimensions of the contacts between the principal members making up the metal-made carrier body do not vary in this invention upon fusion of the brazing material coating layer by its heat treatment. Under the same configurations and dimensions as those before the heat treatment, the brazing material whose surface tension has been lowered owing to its fusion is allowed to penetrate into each contact by capillarity, thereby forming a fused brazing material cumulation there. The principal members can therefore be bonded together firmly.

The present invention will hereinafter be described in further detail by the following Examples. It should however be borne in mind that the present invention is not necessarily limited to the following Examples unless the spirit or scope of the present invention is departed.

EXAMPLE 1

A planar band, which was made of a thin ferrite stainless steel band containing 20% of chromium and 5% of aluminum, having a thickness of 0.04 mm and a width of 74.5 mm, and a corrugated band obtained by causing a thin ferrite stainless steel band of the same type as that mentioned above to pass between forming gears and defining 1.2 mm-high longitudinal ridges at a pitch of 2.5 mm were superposed to establish contacts therebetween. They were next rolled together into a spiral form and were fixed together by spot welding at desired points, whereby a multi-layered composite body having an external diameter of 70 mm and defining a number of network-patterned gas flow passages along the central axis thereof was formed.

The above multi-layered composite body was inserted in a metal-made cylinder which had an inner diameter of 70 mm and a wall thickness of 1 mm, so that a desired structure was obtained. After cleaning the structure by degreasing and acid pickling, electroless nickel-boron plating was applied. The thickness of the resultant plating was about 5 μm.

Thereafter, the structure was heated up to about 1,250° C. in a vacuum furnace. By this heat treatment, there was obtained a metal-made carrier body for an exhaust gas cleaning catalyst, in which the contacts between the planar band and corrugated band as well as the contacts between the bands and the metal-made casing were brazed firmly with nickel braze.

EXAMPLE 2

Heat-resistant steel bands of the same type as those used in Example 1 were used. Planar and corrugated bands were cut into pieces of the same configurations and dimensions. They were alternately laminated in layers, thereby forming a multi-layered composite body having an oval cross-section of 120 mm × 70 mm and a length of 74.5 mm.

The multi-layered composite body was bonded at desired points by welding. After inserting the thus-welded multi-layered composite body in a metal-made casing having an internal cross-section of substantially the same configurations, they were subjected to a similar cleaning treatment as in Example 1. Thereafter, they were subjected first to electroless copper plating and then to electroless nickel plating, followed by a heat treatment. As a result, it was possible to obtain a metal-made carrier body for an exhaust gas cleaning catalyst, in which the contacts between the planar band and corrugated band as well as the contacts between the bands and the metal-made casing were brazed firmly.

EXAMPLE 3

Heat-resistance steel bands of the same type as those used in Example 1 were used. Planar and corrugated bands were cut into pieces of the same configurations and dimensions. They were alternately laminated in layers, thereby forming a multi-layered composite body having an oval cross-section of 100 mm × 70 mm and a length of 55 mm.

The multi-layered composite body was boned at desired points by welding. After inserting the thus-welded multi-layered composite body in a metal-made casing having an internal cross-section of substantially the same configurations, they were subjected to an electroless phosphorus-nickel plating treatment and a heat treatment in the same manner as in Example 1. As a result, it was possible to obtain a metal-made carrier body for an exhaust gas cleaning catalyst, in which the contacts between the planar band and corrugated band as well as the contacts between the bands and the metal-made casing were brazed firmly.

We claim:

1. A process for the fabrication of a metal-made carrier body for an exhaust gas cleaning catalyst, which comprises superposing at least one sheet-like metal band and at least one corrugated metal band, each of said bands being made of a thin metal sheet, one over the other so as to establish contacts therebetween, thereby forming a multi-layered composite body defining a number of network-patterned gas flow passages along the central axis thereof, dipping the composite body in an electroless plating bath capable of forming a brazing coating layer on the composite body so as to form a brazing coating layer at least in the vicinity of each contact except for the contact itself, and then subjecting the resultant coated composite body to a heat treatment so as to braze the composite body at the contacts between the sheet-like metal band and corrugated metal band while preventing bonding material from being interposed between the contacts between the sheet-like metal band and the corrugated metal band.

2. The process as claimed in claim 1, wherein the electroless plating path contains a plating component selected from copper, nickel, a copper-base alloy or a nickel-base alloy.

3. The process as claimed in claim 2, wherein said electroless plating bath contains a plating component selected from copper and copper-based alloys and each of said metal bands comprises an iron containing material.

4. The process as claimed in claim 1, wherein the multi-layered composite body is obtained by superposing the sheet-like metal band made of the thin metal sheet and the corrugated metal band one over the other so as to establish contacts therebetween and then rolling the thus-superposed bands together into a spiral form so as to achieve a multi-layered structure defining a number of network-patterned gas flow passages along the central axis thereof.

5. The process as claimed in claim 1, wherein the multi-layered composite body is obtained by superposing the sheet-like metal band made of the thin metal sheet and the corrugated metal band in layers so as to establish a multi-layered structure defining a number of network-patterned gas flow passage along the central axis thereof.

6. The process as claimed in claim 1, wherein during said heat treatment said brazing coating is caused to accumulate to areas adjacent to said contacts between said metal bands.

7. A process for the fabrication of a metal-made carrier body for an exhaust gas cleaning catalyst, said carrier body being enclosed within a cylindrical metal casing, characterized in that said process comprises superposing at least one sheet-like metal band and at least one corrugated metal band, each of said bands being made of a thin metal sheet, one over the other so as to establish contacts therebetween, thereby forming a multi-layered composite body defining a number of networkpatterned gas flow passages along the central axis thereof, enclosing the composite body in the cylindrical metal casing, dipping the composite body together with the cylindrical metal casing enclosing the composite body therein in an electroless plating bath capable of forming a brazing coating layer on the composite body so as to form a brazing coating layer at least in the vicinity of each of the contacts between the sheet-like metal band and corrugated metal band and between the composite body and cylindrical metal casing except for the contact itself, and then subjecting the resultant coated composite body to a heat treatment so as to braze the composite body at the contacts between the sheet-like metal band and corrugated metal band and between the composite body and the cylindrical metal casing while preventing bonding material from being interposed between the contacts between the sheet-like metal band and corrugated metal band and between the composite body and the cylindrical metal casing.

8. The process as claimed in claim 7, wherein the electroless plating bath contains a plating component selected from copper, nickel, a copper-base alloy or a nickel-base alloy.

9. The process as claimed in claim 8, wherein said electroless plating bath contains a plating component selected from copper and copper-based alloys and each of said metal bands comprises an iron containing material.

10. The process as claimed in claim 7, wherein the multi-layered composite body is obtained by superposing the sheet-like metal band made of the thin metal sheet and the corrugated metal band over the other so as to establish contacts therebetween and then rolling the thus-superposed bands together into a spiral form so as to achieve a multi-layered structure defining a number of network-patterned gas flow passages along the central axis thereof.

11. The process as claimed in claim 7, wherein the multi-layered composite body is obtained by superposing the sheet-like metal band made of the thin metal sheet and the corrugated metal band in layers so as to establish a multi-layered structure defining a number of network-patterned gas flow passage along the central axis thereof.

12. The process as claimed in claim 7, wherein during said heat treatment said brazing coating is caused to accumulate to areas adjacent to said contacts between said metal bands.

* * * * *